No. 712,944. Patented Nov. 4, 1902.
J. C. LOTTERHAND.
TYPE WRITER.
(Application filed Jan. 17, 1901.)

(No Model.) 2 Sheets—Sheet 1.

No. 712,944. Patented Nov. 4, 1902.
J. C. LOTTERHAND.
TYPE WRITER.
(Application filed Jan. 17, 1901.)
(No Model.) 2 Sheets—Sheet 2.

# UNITED STATES PATENT OFFICE.

JASON C. LOTTERHAND, OF NEW YORK, N. Y., ASSIGNOR TO JOHN T. LANGHORNE AND WALTER B. MANNY, OF NEW YORK, N. Y.

TYPE-WRITER.

SPECIFICATION forming part of Letters Patent No. 712,944, dated November 4, 1902.

Application filed January 17, 1901. Serial No. 43,599. (No model.)

*To all whom it may concern:*

Be it known that I, JASON C. LOTTERHAND, a citizen of the United States, residing at the city of New York, in the county of New York and State of New York, have invented certain new and useful Improvements in Type-Writers, of which the following is a description, reference being had to the drawings, forming part of this specification.

My invention consists in certain improvements in type-writing machines, which will be hereinafter more fully described, and particularly pointed out in my claims.

Figure 1:
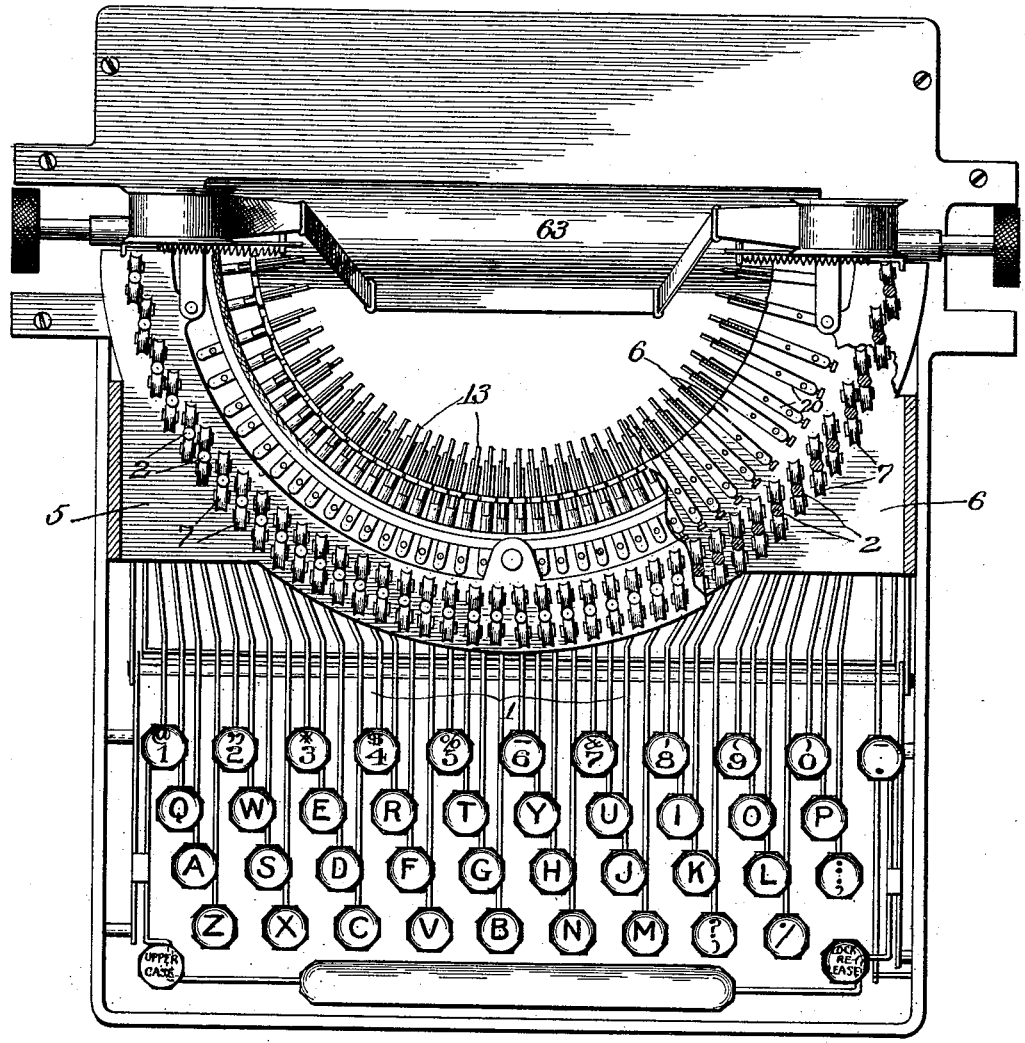
Figure 2:
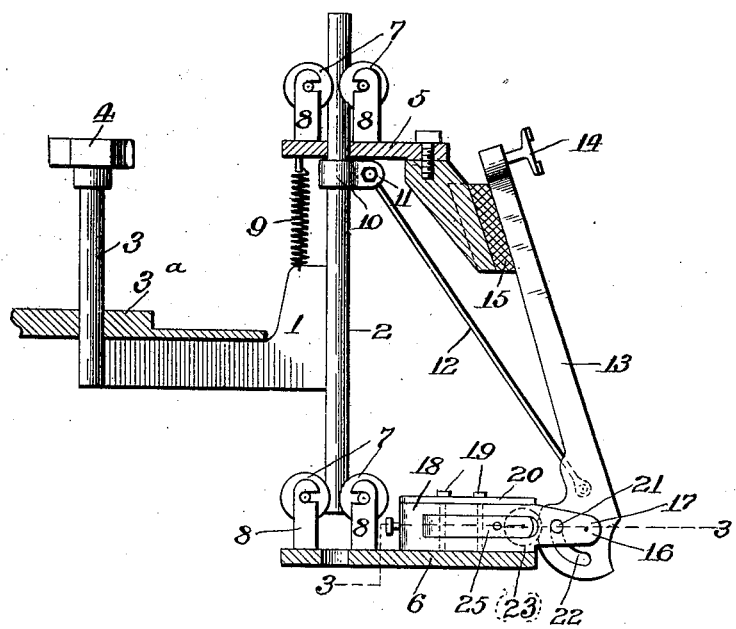
Figure 3:
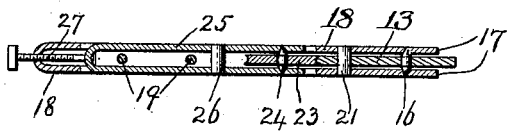

In the accompanying drawings, Figure 1 is a top plan view, partly in section, of so much of my new machine as is necessary to illustrate my invention; Fig. 2, a detail side elevation of the key and type-bar mechanism, and Fig. 3 an enlarged sectional detail on the line 3 3 of Fig. 2.

The same reference-numerals refer to identical parts in the several views.

The operating type-keys of the machine consist of thin arms or plates 1, rigidly secured at their rear ends to vertically-sliding rods 2 (or formed integral therewith) and having secured to their front ends vertical stems 3, passing upward through and loosely guided in apertures in the forward top plate 3ª of the machine and carrying at their upper ends the usual key-buttons 4. The rods 2 are arranged in a semicircle in front of and concentric to the printing-point, as shown in Fig. 1, and are guided at their upper and lower ends in the frame-plates 5 and 6 or bearings upon said plates. Each of these plates is provided with a semicircular row of coincident apertures for the passage of the upper and lower ends of the rods 2; but in the present instance to relieve friction the rods 2 do not have their bearings directly in said apertures, but are guided by and have their bearings between pairs of grooved antifriction-rollers 7, which are mounted, as shown, in supports 8 upon the frame-plates 5 and 6. Coiled springs 9, connected at their lower ends to the key-plates 1 and at their upper ends to the under side of the frame-plate 5, yieldingly hold the rods 2 in elevated position and serve to return them thereto after depressions of the keys. Secured upon the rods 2 are collars 10, provided upon their rear or inner sides with ears 11, projecting radially toward the printing-point, to which ears are connected the upper and outer ends of wires or rods 12, whose lower or inner ends are connected to the type-bars 13. These type-bars are pivotally supported at their lower ends, concentric to the printing-point, in hangers, hereinafter described, upon the frame-plate 6 and carry at their upper ends the usual type-blocks 14, bearing upper and lower case type characters. The depression of the rods 2 causes the type-bars to be swung inward and downward and their type brought into contact with the upper side of the platen-roller at the printing-point, while the return of the parts by the springs 9 restores the type-bars to their normal position, where they rest against a suitable semicircular support 15, secured to and depending from the frame-plate 5.

As will be understood from the foregoing description, the rods 2, plates 1, stems 3, and buttons 4 constitute a rigid vertically-reciprocating key structure or element, of which structure the rods 2, to which the type-bars 13 are connected by the rods 12, are located in a semicircle concentric to, and consequently equidistant from, the printing-point, while the forwardly-extending and slightly-bent plates 1 of different lengths enable the operating key-buttons carried by their front ends to be properly located in the keyboard of the machine. This construction, by the provision of the concentrically-arranged rods 2 equidistant from the printing-point and the pivoting of the type-bars in the arc of a smaller circle between the rods 2 and the printing-point and concentric to the latter, brings all of the rods 2 into precisely the same relation to their respective type-bars and permits the employment of type-bars of uniform size and shape and the direct connection of the rods and bars by uniformly-disposed connecting-rods 12. The result is that the rods and type-bars and their intermediate connections for all of the keys of the machine are identical with each other in size and shape and in location, both relatively to each other and to the printing-point, which not only facilitates and cheapens the manufacture of these parts, but produces a uniformity of operation not otherwise readily attainable. If the operating key-buttons of the machine were located directly upon the upper ends of the rods 2, the power required for operating all of the type-bars would manifestly be the same and the "touch" of the keys consequently identical, which is a desideratum in machines of this character, and inasmuch as the operating key-buttons, although located at differing distances from the rods 2 in the keyboard of the machine, are rigidly connected to the rods by the thin light plates or arms 1, entirely supported and carried by the rods and all having precisely the same "dip" or limit of depression, the touch upon the key-buttons is not, in fact, materially different from what it would be if they were located directly upon the upper ends of the rods, as suggested.

The type-bar hangers are arranged in concentric order upon and secured to the upper side of the frame-plate 6 and project radially beyond its inner edge toward the printing-point. The type-bar 13 is pivoted at 16 between ears 17, projecting inwardly from and constituting the inner extremities of a reversely-bent or U-shaped plate 18, set on edge upon the frame-plate 6 and clamped thereto by screw-bolts 19, passing through a top or cover plate 20, resting upon the top of the plate 18, and screwed at their lower ends into the frame-plate 6. The parallel inner ends or ears of the plate 18 are securely riveted together at a point removed from the pivot 16 of the type-bar by a rivet 21, which passes through a curved slot 22 in the type-bar. The pivot 16 of the type-bar forms a rigid part of the bar, projecting from the opposite sides thereof and provided with cone-surfaces to fit cone-seats formed to receive them in the apertures in the ears 17. The construction and adjustment of these parts are such that while the ears 17 fit closely enough against the opposite sides of the bar 13 to prevent any considerable lateral play or wabbling of the bar they do not bear against it in such a way as to produce any friction between themselves and the bar. For the purpose of preventing lateral play of the bar and preserving alinement without producing friction I employ in each hanger a grooved roller 23, adapted to receive the lower and outer end of the type-bar 13, which is curved concentrically to its pivotal axis 16 and suitably shaped to enable it to coöperate with said roller. The grooved roller 23 is provided upon its opposite sides with trunnions 24, having cone-bearing surfaces fitting in corresponding seats formed for them in the front ends of a second reversely-bent or U-shaped plate 25, which is seated in longitudinal slots or guideways formed in the opposite sides of the plate 18, so as to be capable of adjustment longitudinally of the plate 18 toward and from the pivotal axis 16 of the type-bar. The opposite sides of this plate 25 are secured together by a rivet 26, and an adjusting-screw 27, threaded through the forward or outer end of the plate 18, at the bend of the latter, is engaged at its inner end with the end of the adjustable plate 25, by means of which screw the plate 25 and roller 23 may be adjusted toward and from the type-bar and its pivot. In assembling the parts prior to securing the plates 18 in position upon the frame-plate 6 the plate 25 will be adjusted by the screw 27 toward the type-bar and its pivot until the grooved roller 23 properly engages the curved edge of the type-bar to form a snug rolling fit therewith without sufficient pressure to create friction, and with the parts so adjusted the plate 18 is placed in position upon the frame-plate 6 and then firmly clamped thereto by means of screw-bolts 19 passing through the top plate 20, as before described. The tightening up of these bolts will compress the plate 18 sufficiently to cause it to tightly bind the adjustable roller-plate 25 in the longitudinal slots in the plate 18 and firmly clamp it in its adjusted position. The parts may be readily readjusted at any time to take up wear or otherwise by loosening the bolts 19, turning the screw 27, and then reclamping them in adjusted position by again tightening up the bolts 19.

The difficulties of providing a type-bar hanger which will permit a compact arrangement of the type-bars side by side and yet preserve the alinement of the bars without creating objectionable friction are well known in this art. In my novel hanger by employing the grooved roller 23 to coöperate with the curved edge of the type-bar I provide, in effect, two bearings for the type-bar at points considerably removed from each other, and thereby reduce to a minimum the possibility of lateral play of the bar. This enables me to leave the pivotal bearing of the bar sufficiently loose and free to avoid objectionable friction, while at the same time insuring and preserving the proper alinement of the type-bars without the employment of any guides for them other than the bearings described. The provision for the adjustment of the grooved roller 23 enables any wear or play of the parts to be readily taken up, while the entire hanger may be cheaply constructed and readily assembled.

I do not claim herein any features shown and claimed in my divisional applications, Serial No. 57,797, filed April 27, 1901; Serial No. 68,697, filed July 17, 1901, and Serial No. 115,985, filed July 17, 1902.

Having thus fully described my invention, I claim—

1. In a type-writer, the combination of a longitudinally-reciprocating rod, a type-bar pivoted at its lower end, and a connection between the upper end of the rod and lower end of the bar for causing the reciprocations of the rod to operate the bar, substantially as described.

2. In a type-writer, the combination of a longitudinally-reciprocating rod, a type-bar pivoted at its lower end, and a connecting-wire between the upper end of the rod and lower end of the bar, substantially as described.

3. In a type-writer, the combination of the reciprocating rod 2, type-bar 13 and wire 12 connecting the upper end of rod 2 with lower end of bar 13, substantially as described.

4. In a type-writer, the combination of the reciprocating rod 2, the collar 10 secured thereon and provided with the projecting ear 11, the type-bar 13, and the wire 12 connected at one end to the ear 11 and at its opposite end to the type-bar 13, substantially as described.

5. In a type-writer, the combination of a reciprocating rod, pairs of grooved antifriction-rollers in which the rod has its bearings near its opposite ends, a type-bar pivoted at its lower end, and a connection between the rod and the lower end of the bar, substantially as described.

6. In a type-writer, the combination of the upper and lower pairs of grooved rollers 7, the reciprocating rod 2 having its bearings therein, the type-bar 13 pivoted at its lower end, and the wire 12 connecting the rod and bar, substantially as described.

7. In a type-writer, the combination of slotted supports 8, the grooved antifriction-rollers 7 provided with spindles or trunnions fitting in the slots in said supports, the reciprocating rod 2 having its bearings between the rollers 7, the type-bar 13, and the wire 12 connecting the rod and bar, substantially as described.

8. In a type-writer, a key structure or element comprising a vertically-reciprocating tubular rod and an arm or plate rigidly secured at its rear end to said rod, in combination with pairs of grooved antifriction-rollers in which the rod has its bearings, substantially as described.

9. In a type-writer, a key structure or element comprising the tubular rod 2, the arm or plate 1 rigidly secured at one end to said rod, and the key-stem 3 secured to the opposite end of the arm or plate 1 and carrying the finger-button 4, in combination with pairs of grooved antifriction-rollers 7 in which the rod 2 has its bearings, substantially as described.

10. In a type-writer, a key element or structure comprising a vertically-reciprocating rod and an operating arm or plate rigidly secured at its rear end to said rod, in combination with a type-bar pivoted at its lower end, and a connection between the lower end of said bar and the upper end of said rod for causing the reciprocations of the rod to operate the bar, substantially as described.

11. In a type-writer, a key structure or element comprising a vertically-reciprocating tubular rod and an operating arm or plate rigidly secured at its rear end to said rod, in combination with pairs of grooved antifriction-rollers in which said rod has its bearings, a type-bar pivoted at its lower end, and a connection between said bar and rod for causing the reciprocations of the rod to operate the bar, substantially as described.

12. In a type-writer, the combination of the vertically-reciprocating rod 2, the arm or plate 1 rigidly secured to and projecting horizontally from said rod, the key-stem 3 secured to the opposite end of the arm 1 and carrying the finger-button 4, the type-bar 13 pivoted at its lower end, and the wire 12 connecting the rod and type-bar, substantially as described.

13. In a type-writer, the combination of a series of longitudinally-reciprocating rods arranged in the arc of a circle concentric to the printing-point, a series of type-bars arranged in the arc of a smaller circle concentric to the printing-point and between the latter and the rods, and a series of wires directly connecting the bars and rods for causing the reciprocations of the rods to operate the bars, substantially as described.

14. In a type-writer, the combination of a series of vertically-reciprocating rods arranged in the arc of a circle concentric to and in front of the printing-point, a series of type-bars arranged in the arc of a smaller circle in rear of the rods and also concentric to the printing-point, and a series of wires directly connecting the bars and rods for causing the reciprocations of the rods to operate the bars, substantially as described.

15. In a type-writer, the combination of the vertically-reciprocating rods 2 arranged in a semicircle in front of and concentric to the printing-point, the type-bars 13 pivoted in a smaller semicircle between the rods and printing-point and also concentric to the latter, and the series of wires 12 connected at their upper outer ends to the rods 2 and at their lower inner ends to the type-bars 13, substantially as described.

16. In a type-writer, the combination of the frame-plates 5 and 6 provided with the series of apertures in vertical line with each other and arranged in the arc of a circle concentric to the printing-point, the pairs of grooved antifriction-rollers 7 mounted in supports upon the plates 5 and 6 adjacent said apertures, the vertically-reciprocating rods 2 passing through the apertures in said plates and having their bearings between the rollers 7 of the respective pairs, the type-bars 13 pivoted in the arc of a circle in rear of the rods 2 and concentric to the printing-point, and the wires 12 connected at their upper outer ends to the rods 2 and at their lower inner ends to the bars 13, substantially as described.

17. In a type-writer, the combination of a series of longitudinally-reciprocating rods arranged in a semicircle in front of and concentric to the printing-point, a series of operating arms or plates rigidly secured at their rear ends to said rods and projecting forward therefrom into the keyboard of the machine, a series of type-bars arranged in a smaller semicircle in rear of the rods and concentric to the printing-point, and connections between the bars and rods for causing the reciprocations of the rods to operate the bars, substantially as described.

18. In a type-writer, the combination of a series of vertically-reciprocating rods arranged in a semicircle in front of and concentric to the printing-point, a series of horizontal operating arms or plates rigidly secured at their rear ends to said rods and extending forward therefrom into the keyboard of the machine, a series of type-bars arranged in a smaller semicircle in rear of the rods and concentric to the printing-point, and connections between the bars and rods for causing the reciprocations of the rods to operate the bars, substantially as described.

19. In a type-writer, the combination of a series of vertically-reciprocating rods arranged in a semicircle in front of and concentric to the printing-point, a series of operating arms or plates rigidly secured at their rear ends to said rods and extending forwardly therefrom and carrying finger-buttons at their front ends in the keyboard of the machine, a series of type-bars arranged in the arc of a smaller semicircle in rear of the rods and concentric to the printing-point, and connections between the bars and rods for causing the reciprocations of the rods to operate the bars, substantially as described.

20. In a type-writer, the combination of the vertically-reciprocating rods 2 arranged in a semicircle in front of and concentric to the printing-point, the arms or plates 1 rigidly secured at their rear ends to the rods 2 and extending forwardly therefrom into the keyboard of the machine, the vertical stems 3 secured to the front ends of the arms 1 and provided with the finger-buttons 4 at their upper ends, the type-bars 13 pivoted in a semicircle in rear of the rods 2 and concentric to the printing-point, and the wires 12 connected at their lower inner ends to the bars 13 and at their upper outer ends to the rods 2, substantially as described.

21. In a type-writer, the combination of a pivoted type-bar having a curved edge concentric with its pivot, and a disk roller whose edge coöperates with said curved edge of the type-bar to maintain the alinement of the type-bar, substantially as described.

22. In a type-writer, the combination of a pivoted type-bar having a curved edge concentric with its pivot, and a disk roller adjustable toward and from said curved edge of the type-bar and coöperating therewith to maintain the alinement of the type-bar, substantially as described.

23. In a type-writer, the combination of a pivoted type-bar having a curved edge concentric with its pivot, and a grooved roller engaging said edge and coöperating therewith to maintain the alinement of the bar, substantially as described.

24. In a type-writer, the combination of a pivoted type-bar having a curved edge concentric with its pivot, and a grooved roller adjustable toward and from the point of the type-bar and coöperating with said curved edge to maintain the alinement of the bar, substantially as described.

25. In a type-bar hanger, the combination of the hanger-plates or ears 17 riveted together at 21, the type-bar 13 pivoted between said ears at 16 and provided with the curved slot 22 for the passage of the rivet 21, and the roller 23 coöperating with the curved edge of the bar 13, substantially as described.

26. In a type-bar hanger, the combination of the hanger-plates or ears 17, the type-bar 13 provided with the projecting axle or trunnions 16 having cone bearing-surfaces fitting corresponding seats in the ears 17, the rivet 21 connecting the plates or ears 17 and passing through the curved slot 22 in the type-bar, and the roller 23 coöperating with the curved edge of the bar 13, substantially as described.

27. In a type-bar hanger, the combination of the hanger-plate 18 provided with the projecting ears 17, the type-bar 13 pivoted between the ears 17 and having the curved bearing-surface concentric to its pivot, and the roller 23 adjustably mounted in the hanger-plate 18 and coöperating with the curved edge of the type-bar, substantially as described.

28. In a type-bar hanger, the combination of the hanger-plate 18 provided with the projecting ears 17 and with the longitudinal slots in its opposite sides, the type-bar 13 pivoted between the ears 17 and having the curved edge concentric with its pivot, the plate 25 mounted in the longitudinal slots in the plate 18 and adjustable lengthwise thereof, and the roller 23 mounted in said plate 25 and coöperating with the curved edge of the type-bar, substantially as described.

29. In a type-bar hanger, the combination of the hanger-plate 18 provided with the projecting ears 17 and with the longitudinal slots in its opposite sides, the type-bar 13 pivoted between the ears 17 and having the curved edge concentric with its pivot, the plate 25 mounted in the longitudinal slots in the plate 18 and adjustable lengthwise thereof, the roller 23 mounted in the plate 25 and coöperating with the curved edge of the type-bar, and means for securing the hanger-plate 18 to the frame of the machine and clamping the plate 25 in adjusted position in the plate 18, substantially as described.

30. In a type-bar hanger, the combination of the hanger-plate 18 having the projecting ears 17 and the longitudinal slots in its opposite sides, the type-bar 13 pivoted between the ears 17 and having the curved edge concentric with its pivot, the plate 25 fitting in the longitudinal slots in the plate 18, the adjusting-screw 27 coöperating with the plates 18 and 25 to adjust the latter toward and from the pivot of the type-bar, and the roller 23 mounted in the adjustable plate 25 and coöp- erating with the curved edge of the type-bar, substantially as described.

31. In a type-bar hanger, the combination of the hanger-plate 18 having the projecting ears 17 and the longitudinal slots in its opposite sides, the type-bar 13 pivoted between the ears 17 and having the curved edge concentric with its pivot, the plate 25 fitting in the longitudinal slots in the plate 18, the adjusting-screw 27 coöperating with the plates 18 and 25 to adjust the latter toward and from the pivot of the type-bar, the roller 23 mounted in the adjustable plate 25 and coöperating with the curved edge of the type-bar, the top plate 20 resting upon the upper edge of the hanger-plate 18, and the screw-bolts for securing the hanger-plate to the frame of the machine and clamping the plate 25 in adjusted position, substantially as described.

32. In a type-bar hanger, the combination of the hanger-plate 18 provided with the projecting ears 17 and with the longitudinal slots in its opposite sides, the type-bar 13 having the axle or trunnions 16 provided with cone bearing-surfaces fitting corresponding seats in the ears 17, the rivet 21 securing the ears 17 together and passing through the curved slot 22 in the type-bar, the plate 25 mounted in the longitudinal slots in the sides of the hanger-plate 18, the roller 23 coöperating with the curved edge of the type-bar and provided with the trunnions 24 having cone bearing-surfaces fitting corresponding seats in the plate 25, the rivets securing the opposite sides of the plate 25 together adjacent the roller 23, and the adjusting-screw 27 coöperating with the plates 18 and 25 to adjust the latter and the roller 23 toward and from the pivot of the type-bar, substantially as described.

JASON C. LOTTERHAND.

Witnesses:
  EDWARD RECTOR,
  JOHN H. BERKSTRESSER.